United States Patent Office 3,272,062
Patented Sept. 13, 1966

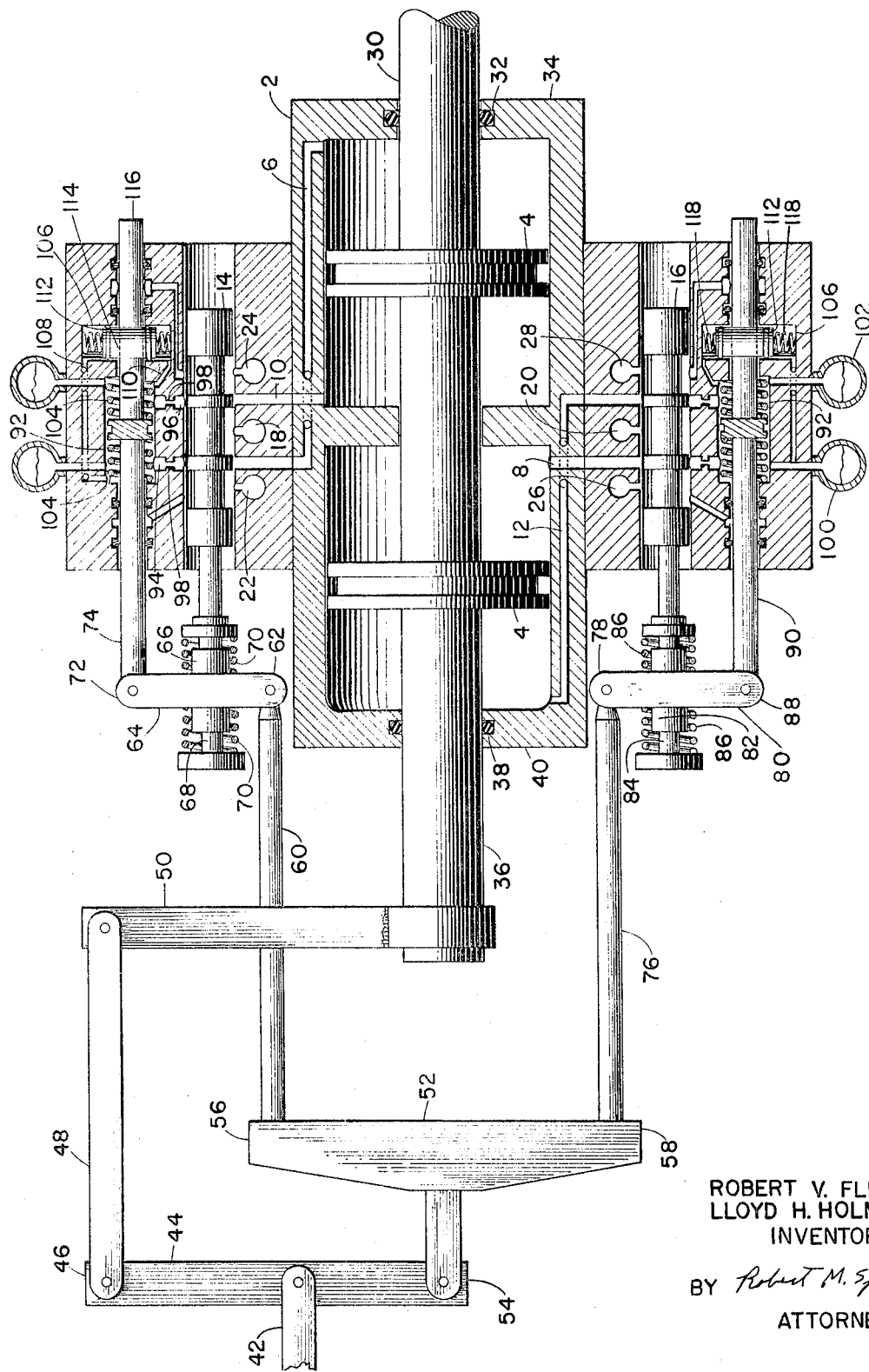

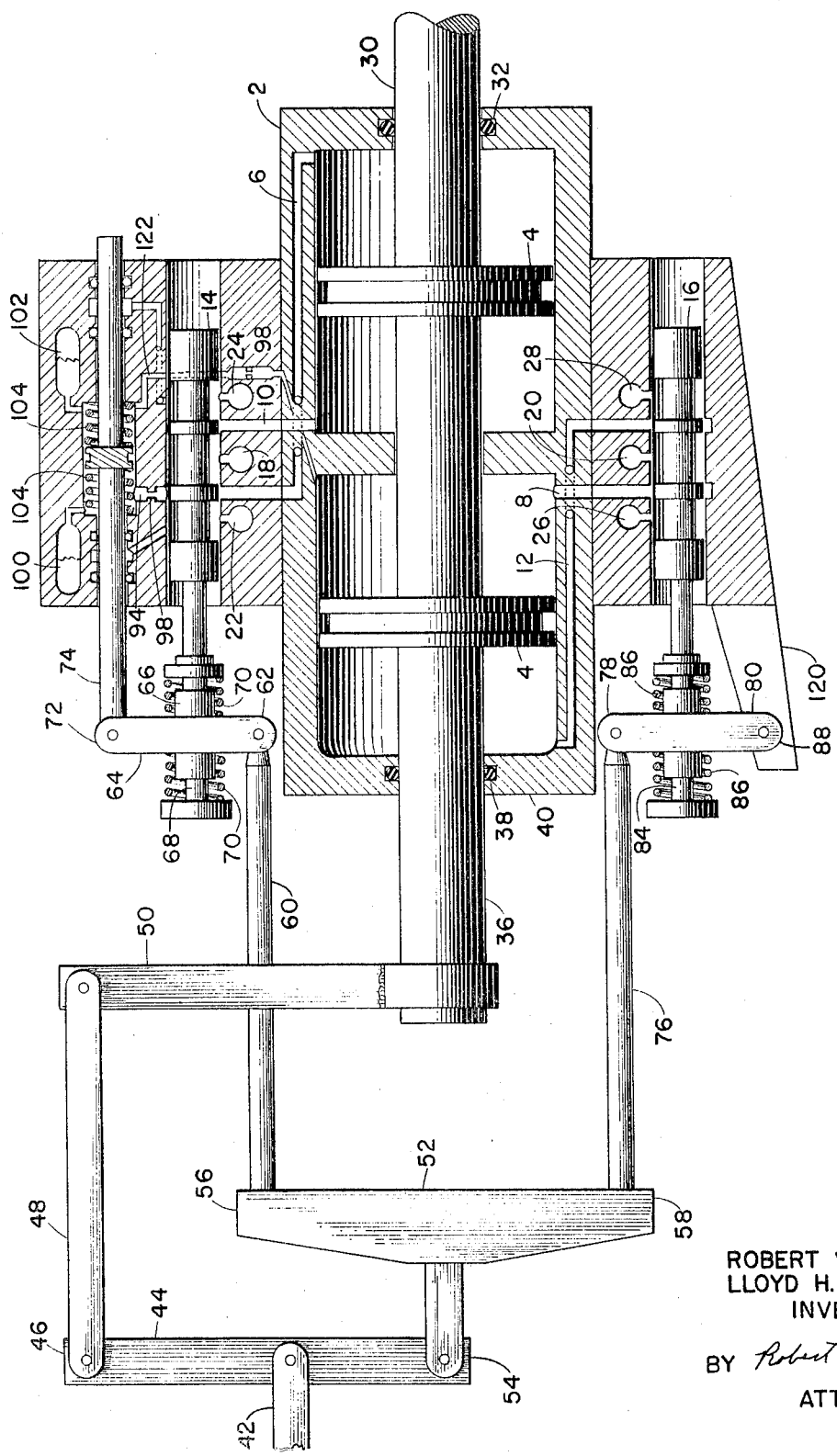

3,272,062
SERVO VALVE SYNCHRONIZER
Robert V. Flippo, Dallas, and Lloyd H. Holmes, Arlington, Tex., assignors, by mesne assignments, to LTV Electrosystems, Inc., Greenville, Tex., a corporation of Delaware
Filed Oct. 7, 1965, Ser. No. 493,697
3 Claims. (Cl. 91—384)

This invention relates to servomechanisms and is particularly directed to novel means for synchronizing hydraulically redundant servo valves.

Mechanically actuated servo valves have long been used in flight control systems to regulate hydraulic actuators for numerous purposes. More recently, the principle of hydraulic redundancy, wherein parallel servo systems drive a common mechanism, has been employed to increase the reliability of such mechanisms. Still more recently, the desire to achieve "fail-safe" control systems has resulted in the use of three parallel connected servo valves. It will be apparent that whenever a plurality of servo valves are connected in parallel, some means must be provided for synchronizing the parallel valves. To accomplish this, it has been proposed to couple the parallel valves by adjustable mechanical linkages. Unfortunately, adjustable linkages have been found to be undependable. Alternatively, it has been proposed to manufacture plural parallel servo valves as an integral piece. However, this greatly increases the cost of the servo systems and suffers the further disadvantage that a cylinder crack, or similar failure, often affects all of the parallel valves in the common structure and defeats the purpose of providing parallel systems. Numerous other synchronization means have been proposed heretofore. However, none of the prior art devices have been entirely satisfactory.

These disadvantages of the prior art are overcome with the present invention and novel means are provided for synchronizing parallel servo valves. Moreover, the device of the present invention is simple and inexpensive to manufacture and yet is self-adjusting so as to assure synchronization of two or more parallel servo valves. Furthermore, with the device of the present invention, control of each of the servo valves is accomplished completely independently of the parallel valves. Consequently, failure of any one of the controlled servo valves will have no effect of the operation of the remaining valves.

The advantages of the present invention are preferably attained by providing a hydraulic actuator having a cylinder, a piston slideable within said cylinder, a piston rod carried by said piston and projecting through the ends of said cylinder, a source of pressurized fluid, a plurality of servo valves connected in hydraulically parallel circuits to regulate the flow of pressurized fluid between said source and said cylinder to control movement of said piston, a control arm, a first rocker arm pivotally mounted on said control arm, a second rocker arm pivotally mounted on one end of said first rocker arm, link means connected said piston rod to the other end of said first rocker arm, a plurality of synchronizing pistons each connected to be actuated by fluid passed by a respective one of said servo valves, a plurality of linkage means each connecting a respective one of said synchronizing pistons to a respective end of said second rocker arm, and means carried by each of said linkage means for controlling the respective one of said servo valves associated therewith.

Accordingly, it is an object of the present invention to provide improved means for controlling hydraulic actuators.

Another object of the present invention is to provide improved means for synchronizing parallel connected servo valves.

An additional object of the present invention is to provide means for independently controlling a plurality of parallel connected servo valves.

A further object of the present invention is to provide "fail-safe" means for controlling a plurality of parallel connected servo valves.

A specific object of the present invention is to provide a hydraulic actuator having a cylinder, a piston slideable within said cylinder, a piston rod carried by said piston and projecting through the ends of said cylinder, a source of pressurized fluid, a plurality of servo valves connected in hydraulically parallel circuits to regulate the flow of pressurized fluid between said source and said cylinder to control movement of said piston, a control arm, a first rocker arm pivotally mounted on said control arm, a second rocker arm pivotally mounted adjacent one end of said first rocker arm, link means connecting said piston rod to the other end of said first rocker arm, a plurality of synchronizing pistons each connected to be actuated by fluid passed by a respective one of said servo valves, a plurality of linkage means each connecting a respective end of said second rocker arm, and means carried by each of said linkage means for controlling the respective one of said servo valves associated therewith.

These and other objects and features of the present invention will be apparent from the following detailed description taken with reference to the figures of the accompanying drawings.

In the drawings:

FIGURE 1 is a view, partly in section, through a hydraulic actuator embodying the present invention; and FIGURE 2 is a view, similar to that of FIG. 1, showing an alternative form of the present invention.

In the form of the present invention chosen for purposes of illustration in FIG. 1, a servo actuator is shown comprising a cylinder 2 and a dual piston 4 slideable therein in response to fluid pressure supplied through conduits 6, 8, 10 and 12 under the control of parallel connected servo valves 14 and 16. It will be apparent that fluid supplied through conduits 6 and 8 will drive piston 4 in one direction, while fluid supplied through conduits 10 and 12 will drive piston 4 in the opposite direction. Servo valve 14 controls the supply of fluid through conduits 6 and 10, while servo valve 16 controls the supply of fluid through conduits 8 and 12. Pressurized fluid is supplied from suitable source, not shown, through inlet port 18, of servo valve 14, and through inlet port 20, of servo valve 16. Outlet ports 22 and 24, of servo valve 14, and outlet ports 26 and 28, of servo valve 16, serve to return fluid to the reservoir or to exhaust the fluid in any appropriate manner.

An actuator shaft 30 is rigidly connected to dual piston 4 and extends through suitable sealing means 32, in one end 34 of cylinder 2, to transmit the motion of piston 4 to a servo controlled means, such as aircraft control surfaces or the like, not shown. The opposite end 36 of shaft 30 projects through sealing means 38 in end 40 of cylinder 2.

Input signals for positioning the servo valves 14 and 16 are transmitted to the servo system via control rod 42 from a suitable control means, such as the manual controls of the human pilot, the automatic pilot system, or the like. Control rod 42 is connected to the fulcrum of a first rocker arm 44, which has one end 46 thereof connected by a link 48 to a post 50 fixedly secured to the end 36 of actuator shaft 30. A second rocker arm 52 is pivotally connected at its fulcrum to end 54 of first rocker arm 44, while the ends 56 and 58 of second rocker arm 52 are connected by identical linkage systems to position servo valves 14 and 16, respectively.

Thus, end 56 of second rocker arm 52 is connected by pushrod 60 to one end 62 of cross-link 64 which is pivotally connected to slider 66. Slider 66 is slideable mounted on an extension 68 of servo valve 14 and is biased by springs 70 to cause cross-link 64 to normally extend perpendicular to the axis of servo valve 14. The opposite end 72 of cross-link 64 is connected to one end of a regulator piston 74 which is hydraulically coupled to valve 14, as described in detail hereafter. Similarly, end 58 of second rocker arm 52 is connected by pushrod 76 to one end 78 of cross-link 80 which is pivotally connected to slider 82. Slider 82 is slideably mounted on extension 84 of servo valve 16 and is biased by spring 86 to cause cross-link 80 to normally extend perpendicular to the axis of servo valve 16. The opposite end 88 of cross-link 80 is connected to one end of a regulator piston 90 which is hydraulically coupled to valve 16, as hereinafter described.

Regulator pistons 74 and 90 are identical and the hydraulic coupling of regulator piston 90 with servo valve 16 is identical to the hydraulic coupling of regulator piston 74 with servo valve 14. Accordingly, for brevity, only regulator piston 74 and its coupling with servo valve 14 will be described. However, to avoid crowding, some of the reference numerals have been applied to the structure of the hydraulic coupling of piston 90 with valve 16. As seen in FIG. 1, regulator piston 74 is slideable within a cylinder 92 which is hydraulically coupled to servo valve 14 by ports 94 and 96 containing flow restrictors 98. In addition, accumulators 100 and 102 are provided adjacent ports 94 and 96, respectively. Centering springs 104 serve to bias regulator piston 74 to a neutral position between ports 94 and 96.

Finally, a locking piston cylinder 106 is formed, extending perpendicular to and communicating with the regulator piston cylinder 92, and is connected by ports 108 and 110 to opposite ends of the regulator piston cylinder 92. A locking piston 112 is slideable in the cylinder 106 and is formed with an opening 114 extending transversely through the locking piston 112 to loosely receive extension 116 of the regulator piston 74. Centering springs 118 normally bias locking piston 112 to a neutral position wherein extension 116 of regulator piston 74 is freely slideable in opening 114.

In operation, command signals for positioning the servomechanism are transmitted, from the pilot, automatic pilot, or the like, via any conventional means, to cause translation of control rod 42, for example, to the right, as seen in FIG. 1. This causes first rocker arm 44 to pivot about end 46 thereof, causing end 54 of first rocker arm 44 to drive second rocker arm 52 to the right. Under normal conditions, the movement of second rocker arm 52 will result in similar and equal movement of push rods 60 and 76. The push rods 60 and 76 apply this movement to cross-links 64 and 80, respectively. Such movement of cross-link 64 is applied through slider 66 and springs 70 to move servo valve 14 to the right. Similarly, the movement of cross-link 80 is applied through slider 82 and springs 86 to move servo valve 16 to the right. The movement of servo valves 14 and 16 allows pressurized fluid from a suitable reservoir, not shown, to flow through inlet port 18 and conduit 10 of servo valve 14 and through inlet port 20 and conduit 12 of servo valve 16 to drive piston 4 and shaft 30 to the right to appropriately position the servomechanism.

As piston 4 and shaft 30 move to the right, post 50, mounted on end 36 of shaft 30 will also be moved to the right. Since post 50 is coupled by link 48 to end 46 of first rocker arm 44, the movement of post 50 will cause first rocker arm 44 to pivot about control rod 42, tending to return first rocker arm 44 to the neutral position shown in FIG. 1. As end 46 of first rocker arm 44 is moved to the right, end 54 of first rocker arm 44 will be moved to the left and this leftward motion will be transmitted in the manner described above to move servo valves 14 and 16 to the left. Thus, when piston 4 and shaft 30 have reached the position commanded by the signal supplied to control rod 42, post 50 and link 48 will have returned first rocker arm 44 to the neutral position and, through the linkages described above, servo valves 14 and 16 will also be returned to their neutral positions. Any subsequent command signal supplied to control rod 42 will result in a similar chain of events.

Any imbalance between the operation of servo valves 14 and 16 will be overcome by regulator pistons 74 and 90, in the manner now to be described. However, since the structure and functioning of regulator pistons 74 and 90 are identical, as noted previously, only the operation of regulator piston 74 will be discussed.

It will be seen that the pressure applied across regulator piston 74 from servo valve 14 by reason of ports 94 and 96 will be substantially identical with the pressure applied across piston 4 from servo valve 14 by reason of conduits 6 and 10. At the same time, however, servo valve 16 is also applying pressure across piston 4 through conduits 8 and 12. Any difference between the pressures applied across piston 4 by servo valve 14 will also appear across regulator piston 74. Thus, for example, if servo valve 14 is applying five p.s.i. more pressure to conduit 6 than to conduit 10, this difference in pressure will appear across regulator piston 74 and will be applied to drive regulator piston 74 toward the right. The movement of cross-link 64 will be transmitted through slider 66 and springs 70 to cause servo valve 14 to be moved to the right to increase the pressure applied by servo valve 14 through conduit 10 and to rebalance the pressure across piston 4.

The restrictors 98 in ports 94 and 96 cooperate with accumulators 100 and 102 to form a time delay system so that regulator piston 74 will not be responsive to pressure surges of short duration, such as might occur when a command signal from control rod 42 is applied to reposition servo valves 14 and 16. However, continuing pressure differentials, such as might occur from malfunctioning of one of the servo valves 14 or 16, will result in movement of regulator piston 74 to correct the imbalance, in the manner described above. It will be understood that, in many instances, the inherent compliance of the hydraulic fluid will satisfy the function of the accumulators 100 and 102. In such instances, the accumulators 100 and 102 may be omitted from the system.

Lock piston 112 is provided to lock the regulator piston 74 to prevent regulation during intervals in which the static load exceeds a predetermined percentage of the maximum load for which the system is designed. As indicated above, locking piston 112 is slideable in cylinder 106 and is formed with a transverse opening 114 which loosely receives extension 116 of regulator piston 74. Ports 108 and 110 serve to hydraulically connect the opposite ends of cylinder 106 to respective sides of regulator piston 74. If an excessive static load occurs across piston 4, this load will be applied through conduits 6 and 10, servo valve 14, ports 94 and 96, and ports 108 and 110 to force locking piston 112 to move in the direction of the lower pressure. When this happens, the sides of opening 114 bear against extension 116 of regulator piston 74 to lock the regulator piston 74 against movement. When the excessive static load is relieved, springs 118 return locking piston 112 to its neutral position and release regulator piston 74 to perform its regular function.

It will be apparent, from FIG. 1 and the foregoing description, that the hydraulic system of servo valve 14 is completely independent of the hydraulic system of servo valve 16. The only interrelations between these systems occur through pressure differentials appearing across piston 4 or through the synchronizing linkage described above. Accordingly, full operation of the piston 4 can be maintained, in spite of malfunctions or even complete failure of either of the servo valves 14 or 16.

Where such complete independence of the servo valves 14 and 16 is not required, the system of FIG. 2 may be employed. This system is similar to that of FIG. 1. However, regulator piston 90, and the associated mechanism, have been eliminated and cross-link 80 is connected between push rod 76 and a fixed stud 120 projecting from the valve body of servo valve 16. In addition, port 96, which provides hydraulic connection between one side of regulator piston 74 and servo valve 14, in the system of FIG. 1, is replaced by conduit 122 which communicates directly with servo cylinder 2 on an appropriate side of piston 4.

The system of FIG. 2 functions in substantially the same manner as the system of FIG. 1, except that, in the system of FIG. 2, a regulator piston 74 serves to adjust servo valve 14 to compensate for imbalances arising in the servo systems of either servo valve 14 or servo valve 16. In contrast, in the system of FIG. 1, regulator piston 74 adjusts servo valve 14 to compensate only for imbalances occurring in the servo system of servo valve 14, while regulator piston 90 adjusts servo valve 16 to compensate for imbalances arising in the servo system of servo valve 16.

Obviously, numerous variations and modifications may be made without departing from the present invention. Accordingly, it should be clearly understood that the forms of the invention described above and shown in the figures of the accompanying drawings are illustrative only and are not intended to limit the scope of the present invention.

What is claimed is:
1. A hydraulic actuator comprising:
a cylinder,
a piston slideable within said cylinder,
a piston rod carried by said piston and projecting through the ends of said cylinder,
a source of pressurized fluid,
a plurality of servo valves connected in hydraulically parallel circuits to regulate the flow of pressurized fluid between said source and said cylinder to control movement of said piston,
a control arm movable to apply command signals to said actuator,
a first rocker arm pivotally mounted on said control arm,
a second rocker arm pivotally mounted on one end of said first rocker arm,
link means connecting said piston rod to the opposite end of said first rocker arm,
a synchronizing piston connected to be actuated by fluid passed by one of said servo valves,
a plurality of linkage means each connected to a respective end of said second rocker arm and coupled to a respective one of said servo valves for controlling the respective one of said servo valves associated therewith in response to movement of said control arm, and
means connecting said synchronizing piston to adjust the position of the linkage means controlling that one of said servo valves which actuates said synchronizing piston in response to pressure differentials occurring between said servo valves.

2. A hydraulic actuator comprising:
a cylinder,
a piston slideable within said cylinder,
a piston rod carried by said piston and projecting through the ends of said cylinder, a source of pressurized fluid,
a plurality of servo valves connected in hydraulically parallel circuits to regulate the flow of pressurized fluid between said source and said cylinder to control movement of said piston,
a control arm movable to apply command signals to said actuator,
a first rocker arm pivotally mounted on said control arm,
a second rocker arm pivotally mounted on one end of said first rocker arm,
link means connecting said piston rod to the opposite end of said first rocker arm,
a plurality of synchronizing pistons each connected to be actuated by fluid passed by a respective one of said servo valves,
a plurality of linkage means each connecting a respective one of said synchronizing pistons to a respective end of said second rocker arm, and
means carried by each of said linkage means for controlling the respective one of said servo valves associated therewith in response to movement of said control arm.

3. A hydraulic actuator comprising:
a cylinder,
a piston slideable within said cylinder,
a piston rod carried by said piston and projecting through the ends of said cylinder,
a source of pressurized fluid,
a plurality of servo valves connected in hydraulically parallel circuits to regulate the flow of pressurized fluid between said source and said cylinder to control movement of said piston,
a control arm movable to apply command signals to said actuator,
a first rocker arm pivotally mounted on said control arm,
a second rocker arm pivotally mounted on one end of said first rocker arm,
link means connecting said piston rod to the opposite end of said first rocker arm,
a plurality of synchronizing pistons each connected to be actuated by fluid passed by a respective one of said servo valves,
a plurality of linkage means each connecting a respective one of said synchronizing pistons to a respective end of said second rocker arm,
means carried by each of said linkage means for controlling the respective one of said servo valves associated therewith in response to movement of said control arm, and
a plurality of lock means each associated with a respective one of said synchronizing pistons and each responsive to low frequency pressure differentials occurring in the servo valve actuating said respective one of said synchronizing pistons to temporarily inactivate said respective one of said synchronizing pistons.

References Cited by the Examiner
UNITED STATES PATENTS

| 3,034,483 | 5/1962 | Rasmussen | 91—384 |
| 3,190,185 | 6/1965 | Rasmussen | 91—411 |
| 3,220,317 | 11/1965 | Fuell | 91—384 |

MARTIN P. SCHWADRON, *Primary Examiner.*
P. E. MASLOUSKY, *Assistant Examiner.*